(No Model.)
W. C. DENISON.
SHADING PEN.
No. 587,476. Patented Aug. 3, 1897.
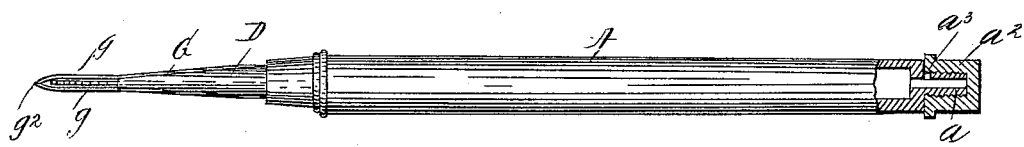
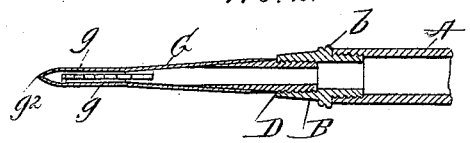
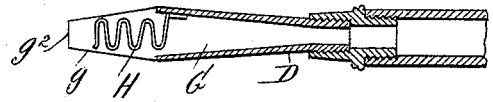
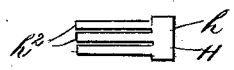
WITNESSES:
John Buckler,
C Gerish
INVENTOR
William C Denison.
BY
Edgar Tate
ATTORNEYS.

UNITED STATES PATENT OFFICE.

WILLIAM CURTIS DENISON, OF ALBUQUERQUE, TERRITORY OF NEW MEXICO.

SHADING-PEN.

SPECIFICATION forming part of Letters Patent No. 587,476, dated August 3, 1897.

Application filed April 8, 1896. Serial No. 586,654. (No model.)

*To all whom it may concern:*

Be it known that I, WILLIAM CURTIS DENISON, a citizen of the United States, and a resident of Albuquerque, in the county of Bernalillo and Territory of New Mexico, have invented certain new and useful Improvements in Shading-Pens, of which the following is a specification, reference being had to the accompanying drawings, forming a part thereof, in which similar letters of reference indicate corresponding parts.

This invention relates to shading-pens; and the object thereof is to provide an improved device of this class which is simple in construction and operation and which, while being perfectly adapted to accomplish the result for which it is intended, is also comparatively inexpensive.

The invention is fully disclosed in the following specification, of which the accompanying drawings form a part, in which—

Figure 1 is a side view of my improved shading-pen with part thereof shown in section; Fig. 2, a central longitudinal section of the pen and the adjacent end of the reservoir or handle; Fig. 3, a similar section at right angles to that shown in Fig. 2, and Figs. 4 and 5 represent modified forms of construction.

In the practice of my invention I provide a tubular handle or reservoir A, one end of which is provided with a screw-threaded extension $a$, which is provided with a removable screw-threaded cap or cover $a^2$, and formed in the screw-threaded extension $a$ is a vent or hollow opening $a^3$. The opposite end of the tubular handle or reservoir A is provided with a screw-threaded plug B, having an annular shoulder $b$ formed thereon, and mounted in said screw-threaded plug B is a screw-threaded tube D, which projects outwardly and which is preferably flattened at its outer end and the side walls of which are inclined or beveled, and secured to the side walls of the tube D, which is wider at its outer end than at its inner end, are steel plates G, the inner ends of which are also beveled, and said plates G are secured to the sides of the tube D by brazing or in any desired manner, and the ends of the plates G are projected, as shown at $g$, and the extreme ends thereof contracted or brought together, as shown at $g^2$.

There is a narrow space between the projected ends $g$ of the plate G, and the sides thereof are cut away, so that the extreme ends $g^2$ are narrower than said plates G at the end of the tube D, and placed between the extensions $g$ of the plate G is a feed-regulator H, which is composed of a flat spring-wire corrugated, as shown in Fig. 3, and one end of which is secured to one side of the tube D. This part may either resemble a flat spring, as is shown in Figs. 2 and 3, or a spring-plate having arms secured thereto and extending in prolongation, as is shown in Figs. 4 and 5. This spring acts as a regulator controlling the flow of the ink.

The operation of this form of construction will be readily understood from the foregoing description when taken in connection with the accompanying drawings. The reservoir is filled with ink in the usual manner, and in operation the ink flows through the tube D, between the plates G and the extensions $g$ thereof, and out between the ends $g^2$ of said plate, and this flow of the ink is regulated and controlled by the feed-regulator H, around which the ink must flow in its passage between the extensions $g^2$ of the plates G.

In Figs. 4 and 5 I have shown two forms of feed-regulators which may be employed in place of the device shown in Figs. 2 and 3, and each consists of a cross head or plate $h$, provided in Fig. 4 with two projecting arms or plates $h^2$ and in Fig. 5 with three of said projecting arms or plates $h^2$, and these devices or either of them may be secured in the end of the tube D between the plates G, so that the arms or plates $h^2$ will project outwardly into the position occupied by the spring H in Figs. 2 and 3, and these devices or either of them will serve to regulate the flow of the ink in the same manner as said spring.

The purpose of the small opening $a^3$ in the extension $a$ of the tubular handle or reservoir is to provide means for admitting air into the reservoir, which is usually necessary in this class of devices in order to secure a proper flow of the ink, and my improved shading-pen is perfectly adapted to accomplish the result for which it is intended, while being comparatively inexpensive.

My invention is not limited to the size of the various parts thereof or the method of making connection between the same or to the width of the plates G or the extensions thereof, and I reserve the right to make all such alterations therein and modifications thereof as fairly come within the scope of the invention.

Having fully described my invention, I claim as new and desire to secure by Letters Patent—

A shading-pen having a tubular handle or reservoir, a screw-threaded extension engaging one end of the same, a revoluble cap or cover secured to said extension, said extension being provided with an opening therein, a screw-threaded plug engaging the opposite end of the said handle, and an annular shoulder formed thereon, a screw-threaded tube mounted in said plug and projecting outwardly therefrom and having a flat outer end, the side walls of said end being beveled or inclined, steel plates secured to said walls at the outer end, the inner ends of said plates being beveled and the outer end projecting beyond said tube and brought together at their extreme point, the said extreme end being narrower than said plates, a spring secured between the said plate extensions and engaging at one end of said spring one side of said tube, all of the said parts being combined substantially as described.

In testimony that I claim the foregoing as my invention I have signed my name, in presence of the subscribing witnesses, this 30th day of March, 1896.

WILLIAM CURTIS DENISON.

Witnesses:
WILLIAM PENN METCALF,
ROSS MAXWELL MERRITT.